(12) United States Patent
Tanaka

(10) Patent No.: US 9,274,808 B2
(45) Date of Patent: Mar. 1, 2016

(54) IMAGE PROCESSING APPARATUS AND HIBERNATION START-UP METHOD

(75) Inventor: Tomoji Tanaka, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 147 days.

(21) Appl. No.: 13/176,990

(22) Filed: Jul. 6, 2011

(65) Prior Publication Data

US 2012/0008165 A1    Jan. 12, 2012

(30) Foreign Application Priority Data

Jul. 8, 2010    (JP) .................................. 2010-155461

(51) Int. Cl.
*G06F 9/44* (2006.01)
*H04N 1/00* (2006.01)

(52) U.S. Cl.
CPC .......... *G06F 9/4418* (2013.01); *H04N 1/00928* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,383,031 A * | 1/1995 | Kida et al. | ..................... | 358/444 |
| 2003/0046371 A1 * | 3/2003 | Falkner | ......................... | 709/220 |
| 2004/0073902 A1 * | 4/2004 | Kao et al. | ....................... | 717/171 |
| 2009/0013171 A1 * | 1/2009 | Gilling | ........................... | 713/100 |
| 2009/0100158 A1 * | 4/2009 | Sonkin et al. | ................... | 709/221 |
| 2009/0157960 A1 | 6/2009 | Koga | | |
| 2009/0161155 A1 * | 6/2009 | Baba et al. | ..................... | 358/1.15 |
| 2010/0238507 A1 * | 9/2010 | Matsushima et al. | .. | G03G 15/50 358/1.16 |

FOREIGN PATENT DOCUMENTS

| | | |
|---|---|---|
| JP | 2004-038545 A | 2/2004 |
| JP | 2004-038546 A | 2/2004 |
| JP | 2004-362426 A | 12/2004 |
| JP | 2006-277277 A | 10/2006 |
| JP | 2009-146061 A | 7/2009 |
| JP | 2010-140156 A | 6/2010 |
| JP | 2010140156 A * | 6/2010 |

OTHER PUBLICATIONS

Office Action (Notice of Grounds of Refection) dated Jun. 19, 2012, issued in corresponding Japanese Patent Application No. 2010-155461, and an English Translation thereof. (5 pages).

* cited by examiner

*Primary Examiner* — Marivelisse Santiago Cordero
*Assistant Examiner* — Keara Harris
(74) *Attorney, Agent, or Firm* — Buchanan Ingersoll & Rooney PC

(57) ABSTRACT

An image processing apparatus includes a volatile main memory, a first non-volatile memory for storing a plurality of types of partial snap shot images, a second non-volatile memory from which information can be read faster than from the first non-volatile memory, for storing an entire snap shot image, and a processor. The processor reads a partial snap shot image corresponding to a state after change from the first non-volatile memory and updates a corresponding portion of the entire snap shot image in the second non-volatile memory.

26 Claims, 7 Drawing Sheets

FIG.5

| Fiery CONTROLLER | PORT 1 | PORT 2 | MEMORY 2G | MEMORY 1G | STATUS ID |
|---|---|---|---|---|---|
| 0 | 0 | 0 | 0 | 1 | 001 |
| 0 | 0 | 0 | 1 | 0 | 002 |
| ⋮ | ⋮ | ⋮ | ⋮ | ⋮ | ⋮ |
| 1 | 0 | 0 | 1 | 0 | 018 |
| ⋮ | ⋮ | ⋮ | ⋮ | ⋮ | ⋮ |

| CONTENTS OF CHANGE IN STATUS | AREA (ADDRESS) IN SSD | AREA (ADDRESS) IN HDD |
|---|---|---|
| 001→002 | ○○○～○○○ | ○○○～○○○ |
| 001→003 | ○○○～○○○ | ○○○～○○○ |
| ⋮ | ⋮ | ⋮ |
| 002→018 | ○○○～○○○ | ○○○～○○○ |
| ⋮ | ⋮ | ⋮ |

101B

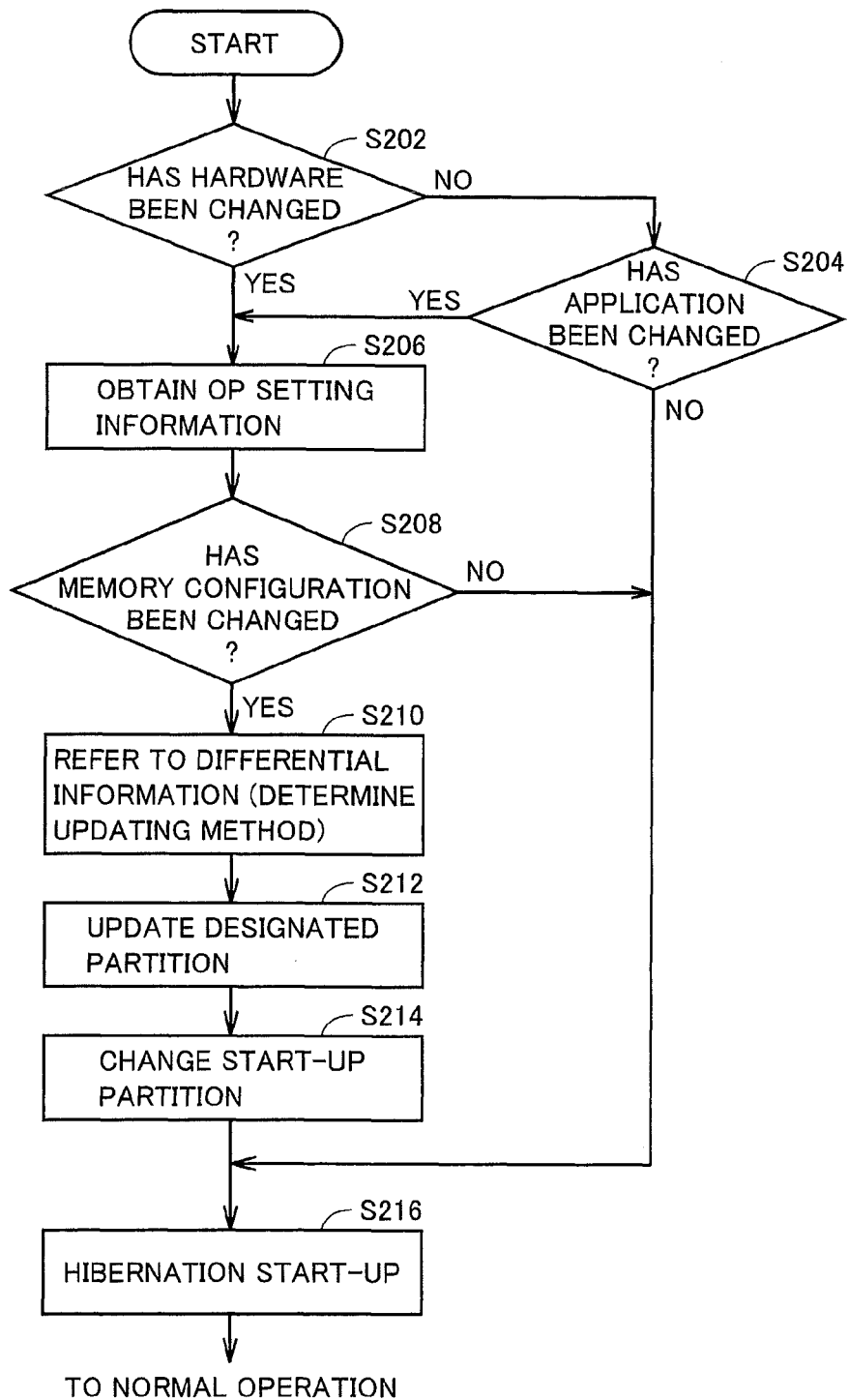

IMAGE PROCESSING APPARATUS AND HIBERNATION START-UP METHOD

This application is based on Japanese Patent Application No. 2010-155461 filed with the Japan Patent Office on Jul. 8, 2010, the entire content of which is hereby incorporated by reference.

BACKGROUND OF THE INVENTION

1. Field of the Invention

The present invention relates to a technique for quickly starting up an image processing apparatus or the like.

2. Description of the Related Art

An image processing apparatus including a hibernation function for quick start-up has been put into practical use. The hibernation function refers to a function to store in a non-volatile memory, data stored in a volatile main memory before power of the image processing apparatus is turned off and to resume at the time of next power-on, an operation from a state immediately before power-off. By adopting this hibernation function, a time required for starting up an image processing apparatus when power is turned on can advantageously be shortened.

For example, Japanese Laid-Open Patent Publication No. 2009-146061 discloses an information processing apparatus and a method of starting up the same, Japanese Laid-Open Patent Publication No. 2009-146061 discloses acquisition of information on a mounted non-volatile memory device, measurement of performance of the non-volatile memory device, estimation of a resume time from hibernation using the non-volatile memory device based on the measured performance of the non-volatile memory device, and determination as to whether to use hibernation start-up at the time of next power-on based on the resume time.

In addition, Japanese Laid-Open Patent Publication No. 2004-038545 discloses a hibernation control method, a hibernation control device, and an image processing apparatus. According to Japanese Laid-Open Patent Publication No. 2004-038545, the image processing apparatus is provided with a print image compression part for compressing a print image, a print image extension part for performing corresponding extension processing, and a memory image storage control part for analyzing whether storage content stored in a main memory is processable by the print image compression part or not to form a compression method table. The memory image storage control part compresses a memory image while switching a CPU compression part and the print image compression part with reference to the compression method table and stores it in an HDD. A memory image recovery control part extends the information read from the HDD while switching a CPU extension part and the print image extension part in conformation to the CPU compression part and the print image compression part used in compression processing, and returns it to the main memory.

Moreover, Japanese Laid-Open Patent Publication No. 2004-038546 discloses a start-up control method, a start-up control device, and an image processing apparatus. According to Japanese Laid-Open Patent Publication No. 2004-038546, a memory image storage control part stores initial start-up data showing storage content (memory image) in a main memory just after initial start-up according to a conventional procedure or swap data to a hard disc device in initial start-up processing in the hard disc device with the use of a hibernation function. A memory image recovery control part reads back the initial start-up data stored in the hard disc device to the main memory with the use of the hibernation function, thereby starting up the apparatus in the initial state.

In many cases, however, various hardware or software options are added to the image processing apparatus and setting of the hardware or the software is changed. When the setting of the hardware or the software is changed, data to be stored in a volatile main memory changes. Namely, start-up with the use of data that has previously been stored in a non-volatile memory cannot be made. In particular, in an example where a hardware configuration is changed such as addition of a memory while power is off or a software configuration is changed such as installation of a new application program, simply storing data in a volatile memory immediately before power-off cannot adapt to quick start-up.

SUMMARY OF THE INVENTION

The present invention was made to solve such problems, and an object of the present invention is to provide an image processing apparatus capable of quickly starting up from hibernation with cost being suppressed, and a hibernation start-up method.

According to one aspect of the present invention, an image processing apparatus includes a volatile main memory, a first non-volatile memory for storing a plurality of types of partial snap shot images for hibernation start-up of the image processing apparatus, a second non-volatile memory from which information can be read faster than from the first non-volatile memory, for storing an entire snap shot image including at least any of the plurality of types of partial snap shot images, and a processor. The processor reads, when a state of the image processing apparatus is changed, a partial snap shot image corresponding to the state after change from the first non-volatile memory, updates a corresponding portion of the entire snap shot image in the second non-volatile memory based on the read partial snap shot image, and causes the image processing apparatus to start up from hibernation by reading the updated entire snap shot image from the second non-volatile memory to the volatile main memory.

Preferably, the second non-volatile memory stores at least the entire snap shot image before the state is changed and the entire snap shot image after the state is changed.

Preferably, the image processing apparatus further includes an operation portion for entering setting involved with the image processing apparatus. The processor reads the partial snap shot image corresponding to entered prescribed setting from the first non-volatile memory and updates a corresponding portion of the entire snap shot image in the second non-volatile memory based on the read partial snap shot image.

Preferably, the processor determines, when power of the image processing apparatus is turned on, whether a hardware configuration of the image processing apparatus has been changed or not, the processor reads the partial snap shot image corresponding to the changed hardware configuration from the first non-volatile memory when it is determined that the hardware configuration has been changed, and the processor updates a corresponding portion of the entire snap shot image in the second non-volatile memory based on the read partial snap shot image.

Preferably, the processor reads, when a software configuration of the image processing apparatus is changed, the partial snap shot image corresponding to the changed software configuration from the first non-volatile memory, and updates a corresponding portion of the entire snap shot image in the second non-volatile memory based on the read partial snap shot image.

According to another aspect of the present invention, a hibernation start-up method in an image processing apparatus including a volatile main memory, a first non-volatile memory for storing a plurality of types of partial snap shot images for hibernation start-up of the image processing apparatus, a second non-volatile memory from which information can be read faster than from the first non-volatile memory, for storing an entire snap shot image including at least any of the plurality of types of partial snap shot images, and a processor is provided. The hibernation start-up method includes the steps of: the processor reading, when a state of the image processing apparatus is changed, a partial snap shot image corresponding to the state after change from the first non-volatile memory; the processor updating a corresponding portion of the entire snap shot image in the second non-volatile memory based on the read partial snap shot image; and the processor causing the image processing apparatus to start up from hibernation by reading the updated entire snap shot image from the second non-volatile memory to the volatile main memory.

Preferably, the second non-volatile memory stores at least the entire snap shot image before the state is changed and the entire snap shot image after the state is changed.

Preferably, the image processing apparatus further includes an operation portion for entering setting involved with the image processing apparatus. The reading step includes the step of reading the partial snap shot image corresponding to entered prescribed setting from the first non-volatile memory. The updating step includes the step of updating a corresponding portion of the entire snap shot image in the second non-volatile memory based on the read partial snap shot image.

Preferably, the reading step includes the steps of determining, when power of the image processing apparatus is turned on, whether a hardware configuration of the image processing apparatus has been changed or not, and reading the partial snap shot image corresponding to the changed hardware configuration from the first non-volatile memory when it is determined that the hardware configuration has been changed. The updating step includes the step of updating a corresponding portion of the entire snap shot image in the second non-volatile memory based on the read partial snap shot image.

Preferably, the reading step includes the step of reading, when a software configuration of the image processing apparatus is changed, the partial snap shot image corresponding to the changed software configuration from the first non-volatile memory. The updating step includes the step of updating a corresponding portion of the entire snap shot image in the second non-volatile memory based on the read partial snap shot image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a first conceptual diagram showing data stored in an NV-RAM 101 according to the present embodiment.

FIG. 6 is a second conceptual diagram showing data stored in NV-RAM 101 according to the present embodiment.

FIG. 8 is a flowchart showing a processing procedure in a variation of the hibernation start-up processing in image processing apparatus 100 according to the present embodiment.

DESCRIPTION OF THE PREFERRED EMBODIMENTS

Figure 1:
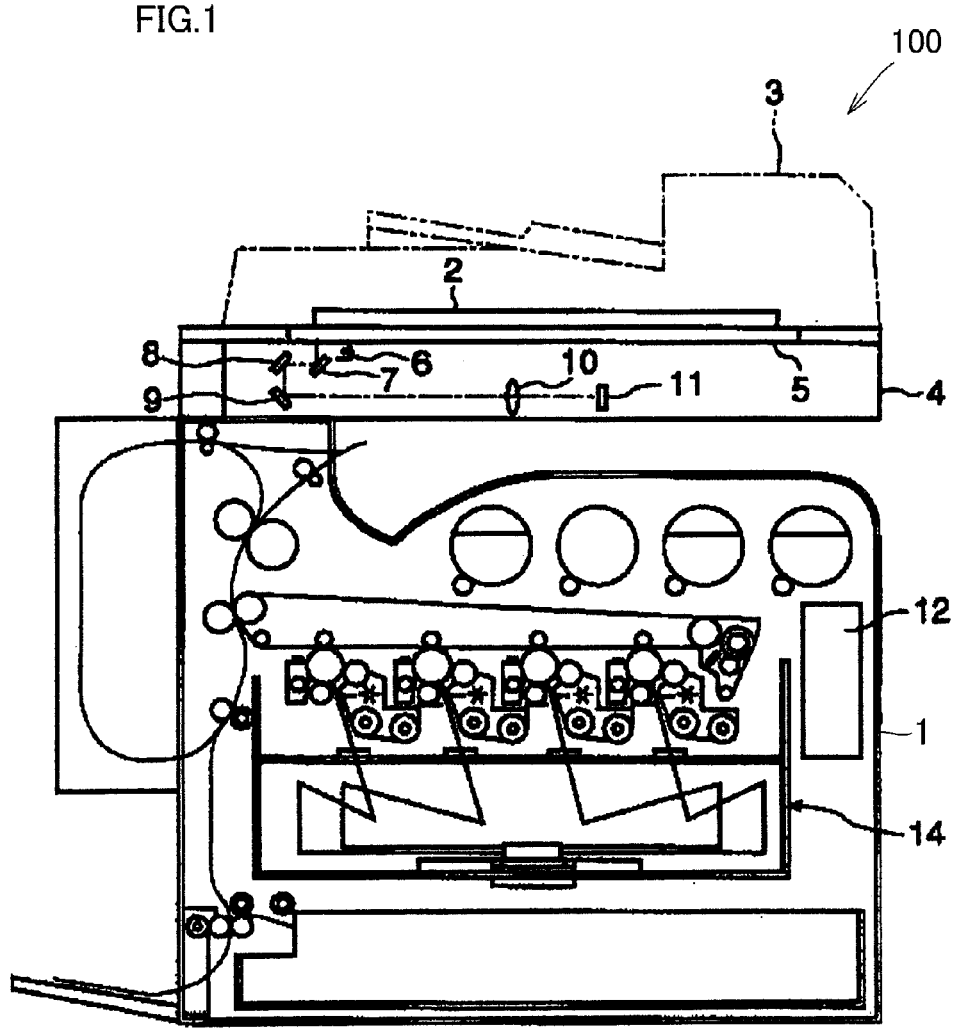
FIG. 1 is a front cross-sectional view representing an overall hardware configuration of an image processing apparatus 100 according to the present embodiment.

An embodiment of the present invention will be described hereinafter with reference to the drawings. In the description below, the same elements have the same reference characters allotted. Their label and function are also identical. Therefore, detailed description thereof will not be repeated.

<Overall Hardware Configuration of Image Processing Apparatus 100>

Figure 2:
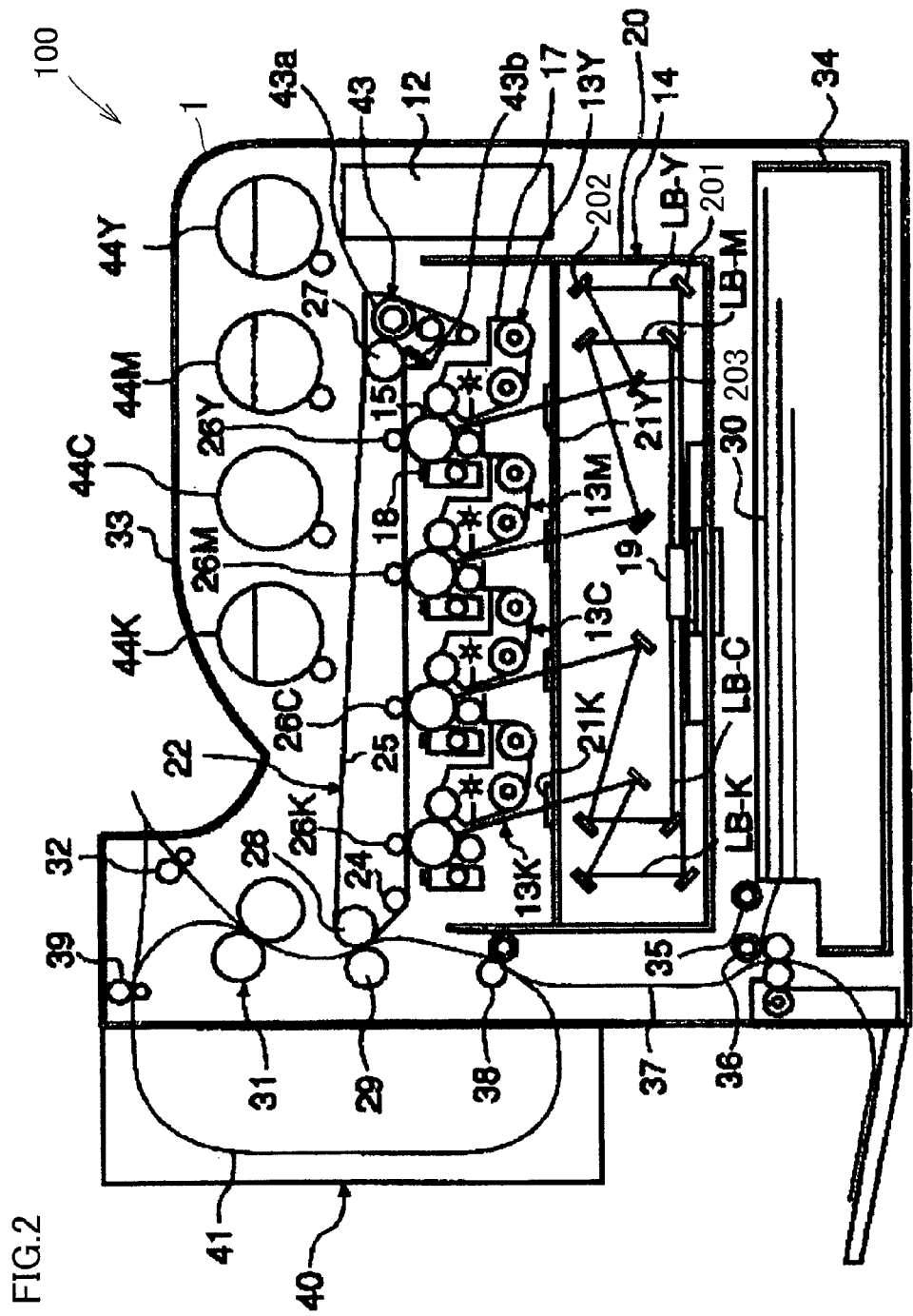
FIG. 2 is a front cross-sectional view representing a hardware configuration of an engine portion of image processing apparatus 100 according to the present embodiment.

One manner of an overall hardware configuration of an image processing apparatus 100 according to the present embodiment will initially be described. FIG. 1 is a front cross-sectional view representing the overall hardware configuration of image processing apparatus 100 according to the present embodiment. FIG. 2 is a front cross-sectional view representing a hardware configuration of an engine portion of image processing apparatus 100 according to the present embodiment.

In the present embodiment, a tandem-type digital color multi function peripheral will be described by way of example of image processing apparatus 100. It is noted that the digital color multi function peripheral can generally execute a scan job for scanning an image of a set document and storing the image in an HDD (Hard disk drive) or the like, a copy job for further printing the image on a sheet of paper or the like, a print job for print on a sheet of paper based on a print instruction from an external terminal such as a personal computer (hereinafter also denoted as a PC), a facsimile job for receiving facsimile data from a facsimile machine or the like and storing the data in the HDD or the like, an HDD print job (a BOX print job) for printing an image stored in the HDD or the like on a sheet of paper or the like, and so forth.

Referring to FIGS. 1 and 2, in an upper portion of a main body 1, an automatic document feeder (ADF) 3 for automatically transporting a document 2 one by one separately and an image scanner 4 for scanning an image on document 2 transported by automatic document feeder 3 are arranged. Image scanner 4 irradiates document 2 placed on a platen glass 5 with a light source 6. Image scanner 4 scans for exposure, a reflected light image from document 2 on an image scanning element 11 implemented by a CCD (Charge Coupled Device) or the like through a reduction optical system constituted of a full rate mirror 7, half rate mirrors 8, 9 and an imaging lens 10. Image scanner 4 uses image scanning element 11 to scan a color material reflected light image of document 2 at prescribed dot density (for example, 16 dots/mm).

Image scanner 4 has such document scanning functions as scanning a FAX transmission document, Scan to E-Mail, Box saving, and the like. A color material reflected light image of document 2 scanned by image scanner 4 is sent to an image processing portion 12, for example, as document reflectance data of three colors of red (R), green (G), blue (B) (each having 8 bits).

Image processing portion 12 subjects the reflectance data of document 2 to prescribed image processing such as shading correction, position displacement correction, lightness/color space conversion, gamma correction, erasing of a frame, edition of color/movement, and the like. In addition, image processing portion 12 can also subject image data sent from a personal computer or the like to prescribed image processing. The image data subjected to prescribed image processing by image processing portion 12 is again converted by image processing portion 12 to document reproduction color material gradation data of four colors of yellow (Y), magenta (M), cyan (C), black (K) (each having 8 bits). The image data is sent to a print head 14, which carries out image exposure onto image forming units 13Y, 13M, 13C, 13K of respective colors of yellow (Y), magenta (M), cyan (C), black (K). Print head 14 serving as an image exposure apparatus carries out image exposure using a laser beam LB, in accordance with the document reproduction color material gradation data of a prescribed color.

In a case of a tandem-type digital color multi function peripheral, in main body 1, as shown in FIGS. 1 and 2, four image forming units 13Y, 13M, 13C, 13K of yellow (Y), magenta (M), cyan (C), black (K) are arranged in parallel at regular intervals in a horizontal direction. These four image forming units 13Y, 13M, 13C, 13K are all configured similarly to one another.

Each of four image forming units 13Y, 13M, 13C, 13K is constituted of a photoconductor drum 15 serving as an image carrier rotationally driven at a prescribed speed, a charging roller for primary charging for uniformly charging a surface of this photoconductor drum 15, print head 14 serving as an image exposure apparatus for forming by exposure, an image corresponding to a prescribed color on a surface of photoconductor drum 15 to thereby form an electrostatic latent image, a developer 17 for developing the electrostatic latent image formed on photoconductor drum 15 with toner of a prescribed color, and a cleaning apparatus 18 for cleaning the surface of photoconductor drum 15.

As shown in FIGS. 1 and 2, print head 14 is configured in common to four image forming units 13Y, 13M, 13C, 13K. Print head 14 modulates not-shown four semiconductor lasers in accordance with the document reproduction color material gradation data of respective colors and emits laser beams LB-Y, LB-M, LB-C, LB-K from the respective semiconductor lasers in accordance with the gradation data. It is noted that print head 14 above may individually be configured for each of the plurality of image forming units.

One rotating polygon mirror 19 is irradiated with laser beams LB-Y, LB-M, LB-C, LB-K emitted from the four respective semiconductor lasers and it deflects and scans the laser beams. Here, among laser beams LB-Y, LB-M, LB-C, LB-K emitted from the four respective semiconductor lasers above, laser beam LB-Y and laser beam LB-M are emitted toward one side surface of rotating polygon mirror 19 and other laser beams LB-C and laser beam LB-K are emitted toward the other side surface of rotating polygon mirror 19.

Consequently, laser beams LB-Y, LB-M and laser beams LB-C, LB-K are opposite to each other in a direction of deflection and scanning by rotating polygon mirror 19. Laser beams LB-Y, LB-M, LB-C, LB-K deflected and scanned by rotating polygon mirror 19 are reflected by a plurality of reflection mirrors 201 to 203 through a not shown f-θ lens. Laser beams LB-Y, LB-M, LB-C, LB-K are scanned for exposure onto photoconductor drums 15 in respective image forming units through a window 21 from diagonally below.

Image processing portion 12 successively outputs image data of respective colors to print head 14 provided in common to image forming units 13Y, 13M, 13C, 13K of respective colors of yellow (Y), magenta (M), cyan (C), black (K), and laser beams LB-Y, LB-M, LB-C, LB-K emitted from this print head 14 in accordance with the image data are scanned for exposure onto the respective surfaces of corresponding photoconductor drums 15. An electrostatic latent image is thus formed.

Then, the electrostatic latent image formed on photoconductor drum 15 is developed by developer 17 as a toner image of each color of yellow (Y), magenta (M), cyan (C), black (K), as shown in FIGS. 1 and 2. The toner images of respective colors of yellow (Y), magenta (M), cyan (C), black (K) are multiply transferred by primary transfer rollers 26 onto an intermediate transfer belt 25 of an intermediate transfer belt unit 22 arranged above each image forming unit 13Y, 13M, 13C, 13K.

Intermediate transfer belt 25 is wound around a drive roller 27, a back-up roller 28 and a tension roller 24 at constant tension. Intermediate transfer belt 25 is circulated and driven in a prescribed direction at a prescribed speed by drive roller 27 rotationally driven by a not-shown dedicated drive motor having excellent constant speed property. For example, a belt made by forming a film of a synthetic resin such as flexible polyimide like a band and connecting opposing ends of the synthetic resin film formed like a band with such means as welding to thereby form the film like an endless belt is employed as intermediate transfer belt 25.

The toner image of respective colors of yellow (Y), magenta (M), cyan (C), black (K) multiply transferred onto intermediate transfer belt 25 above is transferred onto a sheet of transfer paper 30 serving as a transfer material, by a secondary transfer roller 29 pressed against back-up roller 28 with the intermediate transfer belt being interposed, by means of pressing force and electrostatic force. Transfer paper 30 onto which the toner images of respective colors has been transferred is transported to a fixer 31 located above.

Secondary transfer roller 29 is located on the side of back-up roller 28. Secondary transfer roller 29 secondarily collectively transfers the toner images of respective colors onto transfer paper 30 transported from below to above. Then, transfer paper 30 onto which the toner images of respective colors have been transferred is subjected to a fixation process with heat and pressure by fixer 31 and thereafter ejected on an ejection tray 33 provided in the upper portion of main body 1 by an ejection roller 32.

In the present embodiment, transfer paper 30 having a prescribed size is transported from a paper feed cassette 34 through a paper transport path 37 to a register roller 38 by a paper feed roller 35 and a roller pair 36 for separated paper transport, and stopped there. Transfer paper 30 is sent to a secondary transfer position of intermediate transfer belt 25 by register roller 38 that rotates at prescribed timing.

It is noted that, in a case of image formation on opposing surfaces of transfer paper 30 in the digital color multi function peripheral, transfer paper 30 on which one surface an image has been fixed is not ejected to ejection tray 33 by ejection roller 32 as it is. The digital color multi function peripheral switches a direction of transport of transfer paper 30 by using a not-shown switching gate and transports transfer paper 30 to a both-surface transport unit 40 through a roller pair 39 for paper transport.

Both-surface transport unit 40 transports transfer paper 30 again to register roller 38 by using a not-shown transport roller pair provided along a transport path 41, with transfer paper 30 being turned over. Then, after the image is transferred and fixed onto the back surface of transfer paper 30, transfer paper 30 is ejected on ejection tray 33. In FIGS. 1 and 2, 44Y, 44M, 44C, 44K represent toner cartridges for supplying toner of prescribed colors to developers 17 of respective colors of yellow (Y), magenta (M), cyan (C), black (K).

<Hardware Configuration of Image Processing Apparatus 100>

Figure 3:
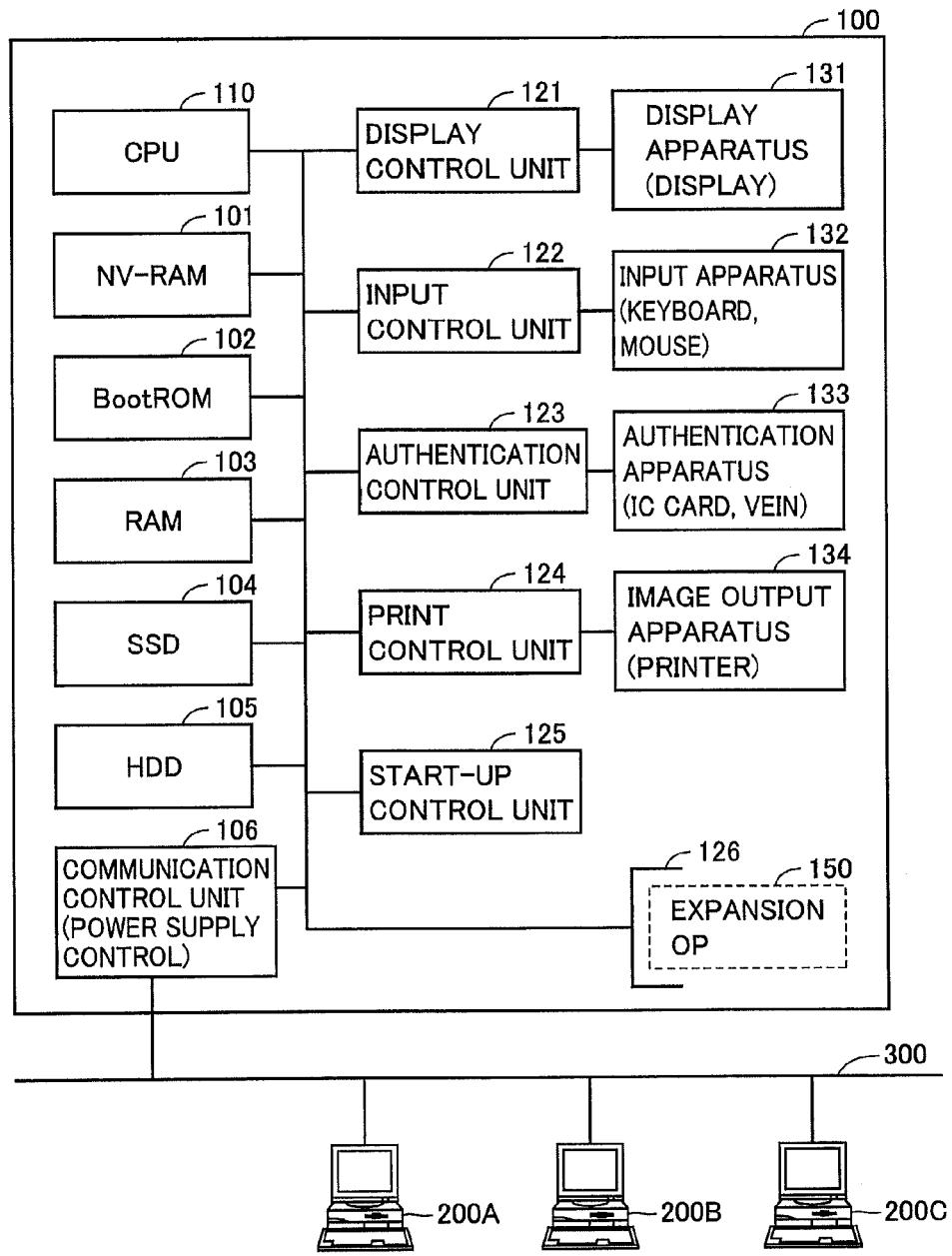
FIG. 3 is a block diagram showing a hardware configuration of image processing apparatus 100 according to the present embodiment.

A hardware configuration of image processing apparatus 100 will now be described. FIG. 3 is a block diagram showing the hardware configuration of image processing apparatus 100 according to the present embodiment.

Referring to FIG. 3, image processing apparatus 100 includes a display apparatus 131, an input apparatus 132, an authentication apparatus 133, and an image output apparatus 134.

For example, various display apparatuses such as a liquid crystal display (LCD) and a CRT (cathode-ray tube) display are employed as display apparatus 131. Input apparatus 132 includes a keyboard, a mouse, and the like that are not shown. Input apparatus 132 may include a tablet. In addition, image processing apparatus 100 may incorporate a touch panel including display apparatus 131 and input apparatus 132.

Authentication apparatus 133 includes a contact/non-contact IC card authentication apparatus, a finger vein authentication apparatus, and the like. Image output apparatus 134 is a printer (an engine) described with reference to FIGS. 1 and 2.

Image processing apparatus 100 includes a CPU (central processing unit) 110. CPU 110 is connected to an NV-RAM (Non Volatile-Random Access Memory) 101, a Boot ROM (Read Only Memory) 102, a standard and optional add-on RAM 103, an SSD (Solid State Drive) 104, a hard disk drive (HDD) 105, a communication control unit (communication interface) 106, a display control unit 121, an input control unit 122, an authentication control unit 123, a print control unit 124, and a start-up control unit 125, through a bus.

An expansion slot 126 for connection of an option is connected to a control bus of image processing apparatus 100. In a standard shipment state, such an option as an add-on RAM is not attached to expansion slot 126 (hereinafter, the state at the time of shipment, that is, the state that no option has been added since shipment, may be referred to as a standard state). An administrator or a user can incorporate new hardware 150 in image processing apparatus 100 through expansion slot 126.

CPU 110 controls an overall operation of image processing apparatus 100 based on data stored in NV-RAM 101, Boot ROM 102, standard and optional add-on RAM 103, SSD 104, and hard disk drive 105.

RAM 103 (volatile memory) provides a work area for an operation of CPU 110. In RAM 103, in the standard state, one memory module implements the work area. It is noted that, when expansion to an optional function is made, a plurality of memory modules can cooperate with one another to implement the work area.

SSD 104 (second non-volatile memory) includes a NAND controller and a NAND flash memory for an SATA (Serial Advanced Technology Attachment) interface. SSD 104 stores an operation program for CPU 110 to execute. SSD 104 is a non-volatile memory that can be accessed more quickly than HDD 105. Namely, start-up control unit 125 can read data faster from SSD 104 than from HDD 105. In the present embodiment, SSD 104 stores a snap shot image for quick start-up (hibernation start-up) as compressed.

Here, the snap shot image refers to data stored in RAM 103 at the time of power-off. In other words, the snap shot image refers to data to be stored in RAM 103 at the time of next power-on.

More specifically, start-up control unit 125 compresses the snap shot image and causes SSD 104 to store the compressed snap shot image when power of image processing apparatus 100 is turned off. Then, when power of image processing apparatus 100 is turned on, start-up control unit 125 extends the snap shot image in SSD 104 and reads the extended snap shot image out to RAM 103.

In the present embodiment, the snap shot image in its entirety is also referred to as the entire snap shot image. It is noted that the entire snap shot image may be data obtained by compressing the snap shot image in its entirety.

HDD 105 (first non-volatile memory) temporarily stores image data or the like of which image is to be formed, when image processing apparatus 100 executes a copy job or a print job. In addition, HDD 105 stores (saves in BOX) image data scanned in a scan job so that the image data can subsequently be output. Further, HDD 105 stores a plurality of types of snap shot differential information (partial snap shot images) for quick start-up (hibernation start-up) (see FIG. 4).

In the present embodiment, a portion of the entire snap shot image different depending on an optional configuration is also referred to as the partial snap shot image. In other words, a portion of the entire snap shot image corresponding to a quick start-up FW (firmware) program corresponding to a most recent (current) optional configuration is also referred to as the partial snap shot image. It is noted that the partial snap shot image may be data obtained by compressing a part of the snap shot image.

For example, HDD 105 stores a partial snap shot image for each combination of options (optional configurations). In this case, the entire snap shot image includes a partial snap shot image corresponding to the optional configuration at that time and a common snap shot independent of the optional configuration.

Alternatively, HDD 105 stores a partial snap shot image for each option. In this case, the entire snap shot image includes a plurality of partial snap shot images corresponding to respective ones of a plurality of options and a common snap shot image independent of the optional configuration.

Start-up control unit 125 selects a partial snap shot image stored in HDD 105 based on the optional configuration of the hardware attached to expansion slot 126 of image processing apparatus 100 and the optional configuration of installed software. Start-up control unit 125 generates the most recent entire snap shot image corresponding to the optional configuration at that time by combining the selected partial snap shot image with the common snap shot image independent of the optional configuration.

In other words, start-up control unit 125 generates the most recent entire snap shot image by updating a part of the entire snap shot image (partial snap shot image) stored in SSD 104 with the partial snap shot image stored in the HDD based on the optional configuration of attached hardware or the optional configuration of installed software.

In the present embodiment, start-up control unit 125 separately from CPU 110 mounted on image processing apparatus 100 updates the entire snap shot image stored in SSD 104. CPU 110, however, may also function as start-up control unit 125 based on the data stored in NV-RAM 101. Namely, start-up control unit 125 may be a partial function of CPU 110.

Figure 4:
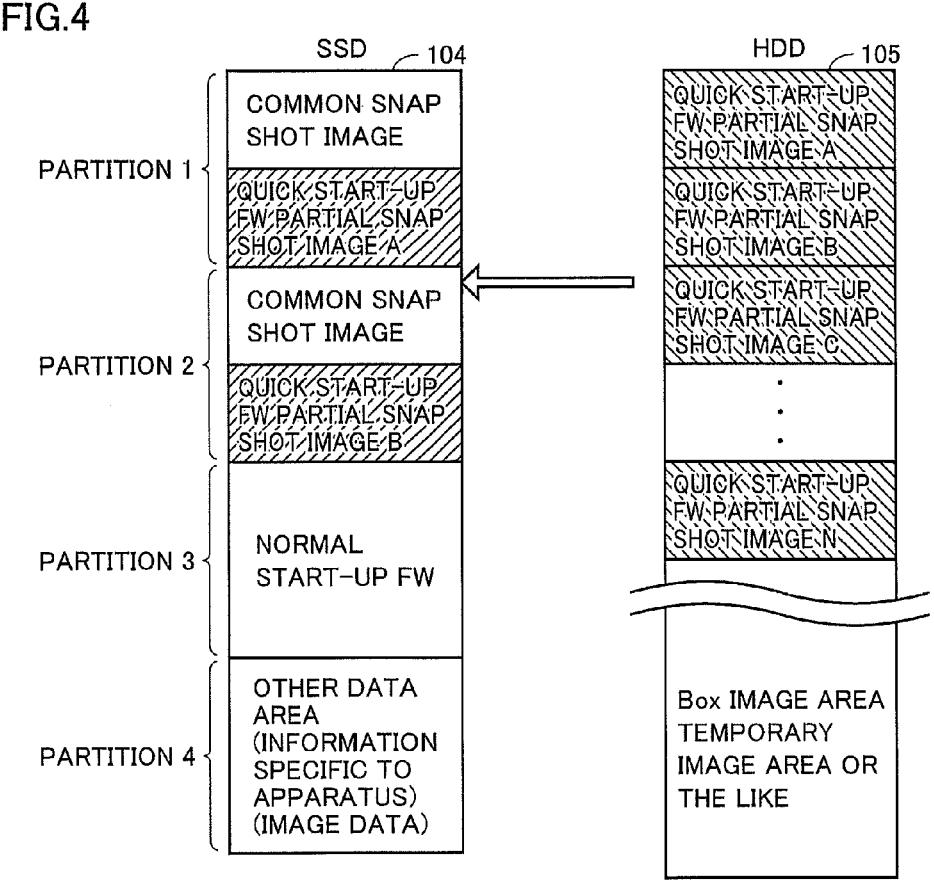
FIG. 4 is a conceptual diagram showing data stored in an SSD 104 and an HDD 105 according to the present embodiment.

The entire snap shot image and the partial snap shot image necessary for hibernation start-up according to the present embodiment will now be described. FIG. 4 is a conceptual diagram showing data stored in SSD 104 and HDD 105.

SSD 104 is provided with a plurality of partitions. In the present embodiment, SSD 104 includes four partitions. At least two partitions each store data of the entire snap shot image made use of for quick start-up. In other words, at least two partitions store quick start-up FW (firmware) programs different from each other.

Start-up control unit 125 makes use of the most recent (current) quick start-up FW (firmware) program, that is, makes use of data corresponding to the most recent (current) hardware configuration and software configuration, with reference to SSD 104, and thus it can cause image processing apparatus 100 to start up from hibernation.

More specifically, the entire snap shot image in the standard state is stored in a partition 1. As described previously, the entire snap shot image includes the common snap shot image and the partial snap shot image. It is noted that, in the standard state, CPU 110 causes hibernation start-up by developing the compressed entire snap shot image stored in partition 1 on RAM 103.

In an example where image processing apparatus 100 now has a hardware configuration or a software configuration different from that in the standard state, such as an example where an option is added to image processing apparatus 100, a partition 2 stores a new entire snap shot image corresponding to the hardware configuration or the software configuration. As will be described later, in the present embodiment, the partial snap shot image in partition 1 and the partial snap shot image in partition 2 are alternately updated.

SSD 104 further stores in a partition 3, a normal start-up FW program made use of in a case where image processing apparatus 100 does not quickly start up with the use of the snap shot image (normally starts up). In the present embodiment, the normal start-up FW program stored in partition 3 is a program which is not a snap shot image, made use of when image processing apparatus 100 normally starts up.

SSD 104 further stores in a partition 4, setting information specific to image processing apparatus 100, image data (temporarily stored image data and image data saved in a BOX described previously), and the like.

HDD 105 stores as the partial snap shot image (quick start-up FW), differential information between each of the entire snap shot images not in the case of the standard state and the entire snap shot image in the standard state. Not in the case of the standard state means that image processing apparatus 100 has a hardware configuration or a software configuration different from that in the standard state, such as a case where an option is added to image processing apparatus 100.

Namely, HDD 105 stores a plurality of partial snap shot images corresponding to a plurality of types of optional configurations respectively. Alternatively, HDD 105 stores a plurality of partial snap shot images corresponding to respective ones of a plurality of options.

It is noted that an optional configuration added to image processing apparatus 100 includes a hardware optional configuration and a software optional configuration. Examples of the hardware optional configuration include a WEB browser function that can be made use of (activated) by attaching an expansion board to expansion slot 126 and entering setting information (hereinafter also referred to as option setting information), such as license information, an audio guidance function, and the like. In addition, examples of the software optional configuration include an application that can be made use of (activated) by installing software on HDD 105 and entering option setting information, and the like.

Such an operation as adding a hardware optional configuration or a software optional configuration to image processing apparatus 100 is generally performed by an administrator responsible for administering image processing apparatus 100, a serviceman who does maintenance of image processing apparatus 100, and the like. In a case of adding a hardware optional configuration, an administrator or a serviceman enters option setting information through an operation panel (display apparatus 131 or input apparatus 132) after he/she attaches an expansion board corresponding to an added option to expansion slot 126. In a case of adding a software optional configuration, an administrator or a serviceman enters option setting information through an operation panel after he/she installs software on HDD 105.

Further, an administrator or a serviceman can not only add an optional configuration but also delete an optional configuration. For example, in deleting the hardware optional configuration, it can be achieved by removing the expansion board attached to expansion slot 126 and then entering prescribed setting through the operation panel, although detailed description thereof will not be provided.

In the present embodiment, start-up control unit 125 rewrites the entire snap shot image in any of partitions 1 and 2 in SSD 104. When any of partitions 1 and 2 in SSD 104 is rewritten, start-up control unit 125 causes NV-RAM 101 to store information indicating the rewritten partition (a start-up FW selection flag).

Start-up control unit 125 rewrites the entire snap shot image in partition 1 and the entire snap shot image in partition 2 alternately. For example, when start-up control unit 125 rewrote the entire snap shot image in partition 1 in SSD 104 previously, it now updates the entire snap shot image in partition 2 and will rewrite the entire snap shot image in partition 1 in SSD 104 next time.

Then, start-up control unit 125 obtains the entire snap shot image for use at the time of start-up or the normal start-up FW program, with reference to the start-up FW selection flag in NV-RAM 101. Namely, CPU 110 makes use of the appropriate entire snap shot image or the normal start-up FW program with reference to NV-RAM 101, and causes image processing apparatus 100 to start up.

A specific configuration for switching between the snap shot images made use of in hibernation start-up according to the present embodiment will now be described. FIG. 5 is a first conceptual diagram showing data stored in NV-RAM 101.

Referring to FIG. 5, NV-RAM 101 stores a status database 101A. It is noted that status database 101A may be stored in a non-volatile memory other than NV-RAM 101.

Status database 101A stores combination of options that can be added in association with a status ID for specifying such combination. It is noted that combination of options that can be added refers to combination of hardware set in image processing apparatus 100, software installed on image processing apparatus 100, and the like. In other words, the status ID specifies the hardware configuration and the software configuration of image processing apparatus 100.

Thus, with reference to NV-RAM 101, start-up control unit 125 causes NV-RAM 101 to store the status ID corresponding to combination of options before change (the hardware configuration and the software configuration of image processing apparatus 100) as change history information. Start-up control unit 125 determines whether any of the hardware configuration and the software configuration of image processing apparatus 100 has been changed or not. Start-up control unit 125 detects new combination of options (the hardware configuration and the software configuration of image processing apparatus 100).

With reference to NV-RAM 101, start-up control unit 125 causes NV-RAM 101 to store the status ID corresponding to the most recent combination of options (the hardware configuration and the software configuration of image processing apparatus 100). Start-up control unit 125 updates the partial snap shot image in SSD 104 with the partial snap shot image corresponding to the most recent status ID. Thus, start-up control unit 125 can read the most recent entire snap shot image stored in SSD 104 on RAM 103 next time image processing apparatus 100 is started up.

Then, a variation of a configuration for switching between the snap shot images made use of in hibernation start-up according to the present embodiment will be described. FIG. 6 is a second conceptual diagram showing data stored in NV-RAM 101.

Referring to FIGS. 5 and 6, NV-RAM 101 stores a data replacement database 101B in addition to status database 101A. It is noted that data replacement database 101B may also be stored in a non-volatile memory other than NV-RAM 101.

Data replacement database 101B stores information indicating a first data area to be updated in SSD 104 and information indicating a second data area in HDD 105 from which reading is carried out, in association with each other, for each method of changing combination of options (the hardware configuration and the software configuration of image processing apparatus 100).

With reference to NV-RAM 101, start-up control unit 125 causes NV-RAM 101 to store the status ID corresponding to combination of options before change (the hardware configuration and the software configuration of image processing apparatus 100) as change history information. Start-up control unit 125 determines whether any of the hardware configuration and the software configuration of image processing apparatus 100 has been changed or not. Start-up control unit 125 detects new combination of options (the hardware configuration and the software configuration of image processing apparatus 100).

With reference to NV-RAM 101, start-up control unit 125 causes NV-RAM 101 to store the status ID corresponding to the most recent combination of options (the hardware configuration and the software configuration of image processing apparatus 100). Start-up control unit 125 obtains information indicating the first data area in SSD 104 and information indicating the second data area in HDD 105 based on the original status ID and the most recent status ID, with reference to data replacement database 101B. Start-up control unit 125 overwrites the first data area in SSD 104 with data in the second data area in HDD 105.

<Hibernation Start-Up Method>

Figure 7:
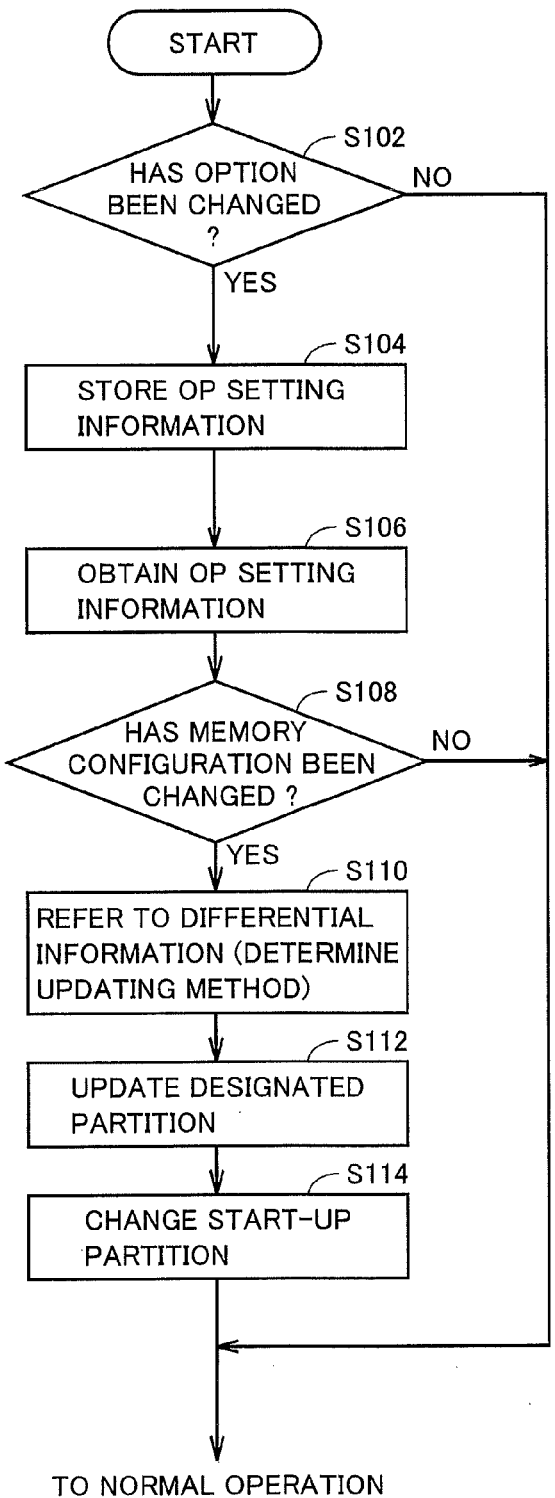
FIG. 7 is a flowchart showing a processing procedure in hibernation start-up processing in image processing apparatus 100 according to the present embodiment.

A hibernation start-up method in image processing apparatus 100 according to the present embodiment will now be described. FIG. 7 is a flowchart showing a processing procedure in hibernation start-up processing in image processing apparatus 100 according to the present embodiment.

Referring to FIG. 7, when the administrator makes option setting through an operation panel or the like in the standard state (YES in step S102), start-up control unit 125 causes NV-RAM 101 to store the entered option setting information (step S104).

When the option addition setting is made, start-up control unit 125 refers to the option setting information saved in NV-RAM 101 and obtains information indicating what kind of configuration change has been made, based on the change history information (step S106). Start-up control unit 125 determines whether change involved with start-up control has been made or not, by comparing the standard state and the state after change with each other, based on the change history information (step S108).

When start-up control unit 125 determines that option setting affecting the snap shot image has not been made (NO in step S108), this process ends. It is noted that change in optional configuration includes change in optional configuration affecting the snap shot image and change in optional configuration not affecting the snap shot image. More specifically, in a case where new hardware or software is added or replaced with hardware or software of a different type, it is likely that data in RAM 103 at the time of start-up of image processing apparatus 100 is changed before and after addition or replacement. On the other hand, in a case of replacement with new hardware of the same type or replacement with up-graded software, it is likely that data in RAM 103 at the time of start-up of image processing apparatus 100 is not changed before and after addition or replacement.

When start-up control unit 125 determines that option setting affecting the snap shot image has been made (YES in step S108), it reads the partial snap shot image for quick start-up which is stored in HDD 105 and adapts to change in option (step S110), and updates a part of the entire snap shot image for quick start-up which is stored in SSD 104 and adapts to change in option (step S112).

More specifically, referring to FIG. 4, in the present embodiment, start-up control unit 125 rewrites the partial snap shot image in any of partitions 1 and 2 in SSD 104. When start-up control unit 125 rewrites any of partitions 1 and 2 in SSD 104, it causes NV-RAM 101 to store information indicating the rewritten partition (start-up FW selection flag).

It is noted that start-up control unit 125 rewrites the partial snap shot image in partition 1 and the partial snap shot image in partition 2 alternately. For example, when start-up control unit 125 rewrote the entire snap shot image in partition 1 in SSD 104 previously, it now updates the partial snap shot image in partition 2 and will rewrite the partial snap shot image in partition 1 in SSD 104 next time.

Then, start-up control unit 125 causes NV-RAM 101 to save as the partition in SSD 104, the start-up FW selection flag for specifying the entire snap shot image for quick start-up for reading and development on RAM 103 by start-up control unit 125 next time main power is turned on (step S114). Start-up control unit 125 returns to a normal operation.

<Variation of Hibernation Start-Up Method>

A variation of the hibernation start-up method in image processing apparatus 100 according to the present embodiment will now be described. FIG. 8 is a flowchart showing a processing procedure in a variation of the hibernation start-up processing in image processing apparatus 100 according to the present embodiment. It is noted that, in FIG. 7, the partial snap shot image stored in SSD 104 is updated based on option setting made by an administrator or the like, and in FIG. 8, the partial snap shot image stored in SSD 104 is updated by start-up control unit 125 as it senses change in optional configuration.

Referring to FIG. 8, when power of image processing apparatus 100 is turned on, start-up control unit 125 (or CPU 110) determines whether change in hardware configuration affecting the snap shot image has been made or not (step S202). For example, with reference to status database 101A, start-up control unit 125 recognizes the previous hardware configuration of image processing apparatus 100 based on the status ID corresponding to the partial snap shot image stored in NV-RAM 101. Start-up control unit 125 transmits a confirmation signal to each piece of hardware in image processing apparatus 100 and receives an identification signal from each piece of hardware, to thereby recognize the current hardware configuration of image processing apparatus 100. Start-up control unit 125 determines whether change in hardware configuration affecting the snap shot image has been made or not, based on the previous hardware configuration and the current hardware configuration. When change in hardware configuration affecting the snap shot image has been made (YES in step S202), start-up control unit 125 performs processing from step S206.

When change in hardware configuration affecting the snap shot image has not been made (NO in step S202), start-up control unit 125 determines whether change in software configuration affecting the snap shot image has been made or not (step S204). When change in software configuration affecting the snap shot image has been made (YES in step S204), start-up control unit 125 performs processing from step S206. When change in software configuration affecting the snap shot image has not been made (NO in step S204), start-up control unit 125 makes transition to hibernation start-up (step S216).

In step S206, start-up control unit 125 obtains information indicating what kind of configuration change has been made, based on change history information, with reference to the option setting information saved in NV-RAM 101. Start-up control unit 125 determines whether change involved with start-up control has been made or not, by comparing the state before change and the state after change with each other, based on the change history information (step S208).

When start-up control unit 125 determines that option setting affecting the snap shot image has not been made (NO in step S208), the process ends.

When start-up control unit 125 determines that option setting affecting the snap shot image has been made (YES in step S208), it reads the partial snap shot image for quick start-up which is stored in HDD 105 and adapts to change in option (step S210). Start-up control unit 125 updates a portion corresponding to change in option, of the entire snap shot image for quick start-up stored in SSD 104, based on the read partial snap shot image (step S212).

Start-up control unit 125 causes NV-RAM 101 to save as the partition in SSD 104, the start-up FW selection flag for specifying the entire snap shot image for quick start-up for reading and development on RAM 103 by start-up control unit 125 next time main power is turned on (step S214).

Start-up control unit 125 causes hibernation start-up (step S216). Start-up control unit 125 makes transition to a normal operation.

SUMMARY

As described above, the image processing apparatus according to the present embodiment stores in advance a plurality of types of partial snap shot images corresponding to combination of a hardware configuration or a software configuration in HDD 105. The image processing apparatus changes the entire snap shot image for launch/development from a flash memory such as SSD 104 to RAM 103, based on the hardware configuration or the software configuration. More specifically, the image processing apparatus causes storage of a partial snap shot image corresponding to combination of a hardware configuration or a software configuration from HDD 105 to a flash memory when an optional function is changed.

Thus, image processing apparatus 100 does not have to read the entire snap shot image from HDD 105 or to update the entire snap shot image in SSD 104. In addition, HDD 105 does not have to store a plurality of types of entire snap shot images. Consequently, image processing apparatus 100 can quickly start up from hibernation, with a capacity required in a high-speed storage medium such as a flash memory being suppressed, that is, increase in cost being avoided.

OTHER EMBODIMENTS

The present invention is naturally applicable also to a case where the present invention is achieved by supplying a program to an image processing apparatus. Then, an effect of the present invention can be enjoyed also by supply of a storage medium storing a program represented by software for achieving the present invention to a system or an apparatus and reading and execution of program codes stored in the storage medium by a computer (or a CPU or an MPU) of the system or the apparatus.

In addition, the "entire snap shot image" refers to a concept encompassing both of one snap shot image as a whole or one snap shot image as a whole as compressed. Moreover, the "partial snap shot image" refers to a concept encompassing all of a part of one snap shot image, a part of one snap shot image as compressed, and a part of one snap shot image as a whole as compressed.

In this case, the program codes themselves read from the storage medium realize the functions in the embodiment described previously, and the storage medium storing the program codes constitutes the present invention.

Further, a case where, by executing the program codes read by the computer, not only the functions in the embodiment described previously are realized but also an OS (operating system) or the like running on the computer performs a part or the entirety of actual processing based on instructions in the program codes so that the functions in the embodiment described previously are realized by that processing, is also naturally included.

Furthermore, a case where, after the program codes read from the storage medium are written in a memory provided in a function expansion board inserted in the computer or a function expansion unit connected to the computer, a CPU or the like provided in the function expansion board or the function expansion unit performs a part or the entirety of actual processing based on instructions in the program codes so that the functions in the embodiment described previously are realized by that processing, is also naturally included.

Examples of the storage media include media storing a program in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus, comprising:
a volatile main memory;
a first non-volatile memory configured to store a plurality of types of partial snap shot images, wherein each of the plurality of types of partial snap shot images is differential information between (i) an entire snap shot image for hibernation start-up of the image processing apparatus in a standard state and (ii) an entire snap shot image for hibernation start-up on said image processing apparatus different in configuration from the standard state;

a second non-volatile memory from which information can be read faster than from said first non-volatile memory, configured to store one of said entire snap shot images, wherein said second non-volatile memory is different from said first non-volatile memory; and a processor configured to:

specify, when a hardware or software or mounted on said image processing apparatus is changed into a different type of hardware or software, respectively, a difference in configuration between said image processing apparatus after the change and the image processing apparatus before the change, wherein said difference in configuration, when said hardware or software is changed into the different type of hardware or software, affects start-up controls, read a partial snap shot image necessary for start-up of said image processing apparatus after the hardware or software is changed into the different type of hardware or software based on said specified difference in configuration, from said first non-volatile memory, rewrite, when hardware or software is changed into the different type of hardware or software, the entire snap shot image in said second non-volatile memory by using said read partial snap shot image and cause said image processing apparatus to start up from hibernation by reading said rewritten entire snap shot image from said second non-volatile memory to said volatile main memory, wherein when said hardware is replaced or said software is upgraded into the same type of hardware or software, (i) said difference in configuration does not affect start-up controls and (ii) said processor does not rewrite the entire snap shot image.

2. The image processing apparatus according to claim 1, wherein said entire snap shot image stored in said second non-volatile memory includes at least one of an entire snap shot image before said configuration is changed and an entire snap shot image after said configuration is changed.

3. The image processing apparatus according to claim 1, further comprising an operation portion for entering setting involved with said image processing apparatus, wherein said processor specifies the difference in configuration between said image processing apparatus after the change and the image processing apparatus before the change based on an entered prescribed setting, reads said partial snap shot image necessary for start-up of said image processing apparatus after the change based on said specified difference in configuration, from said first non-volatile memory, and rewrites, when the hardware or software is changed into the different type of hardware or software, the entire snap shot image in said second non-volatile memory by using said read partial snap shot image.

4. The image processing apparatus according to claim 1, wherein said processor determines, when power of said image processing apparatus is turned on, whether change from a configuration of said image processing apparatus when power was previously turned off has been made, when it is determined that said configuration has been changed, said processor specifies the difference in configuration between said image processing apparatus after the change and said image processing apparatus before the change, said processor reads said partial snap shot image necessary for start-up of said image processing apparatus after the change based on said specified difference in configuration, from said first non-volatile memory, and said processor rewrites, when the hardware or software is changed into the different type of hardware or software, the entire snap shot image in said second non-volatile memory by using said read partial snap shot image.

5. The image processing apparatus according to claim 1, wherein said processor specifies, when the software of said image processing apparatus is changed into the different type of software, the difference in configuration between said image processing apparatus after the change and the image processing apparatus before the change, reads said partial snap shot image necessary for start-up of said image processing apparatus after the change based on said specified difference in configuration, from said first non-volatile memory, and rewrites the entire snap shot image in said second non-volatile memory by using said read partial snap shot image.

6. The image processing apparatus according to claim 1, wherein the second non-volatile memory stores a plurality of the entire snap shot images, and the processor is configured to rewrite one of the plurality of the entire snap shot images according to a predetermined sequence.

7. The image processing apparatus according to claim 6, wherein the second non-volatile memory stores a first entire snap shot image and a second entire snap shot image, and the processor is configured to rewrite the first entire snap shot image and the second entire snap shot image alternately each time the configuration of the image processing apparatus is changed.

8. The image processing apparatus according to claim 1, wherein said differential information corresponds to an optional configuration, and said entire snap shot image includes said partial snap shot image based on said differential information corresponding to said optional configuration of said image processing apparatus and a common snap shot image corresponding to a configuration different from said optional configuration.

9. The image processing apparatus according to claim 1, wherein said second non-volatile memory is further configured to store a normal start-up firmware program which is used for start-up of said image processing apparatus without the use of a quick start up.

10. The image processing apparatus according to claim 1, wherein, when said entire snap shot image is rewritten, said rewritten entire snap shot image includes a snap shot image for hibernation start-up of said image processing apparatus in said standard state and a partial snap shot image corresponding to a configuration not included in said image processing apparatus in said standard state.

11. The image processing apparatus according to claim 1, wherein said image processing apparatus in said standard state is an image processing apparatus not having hardware or software added as compared with the image processing apparatus at time of shipment, and said image processing apparatus different in configuration from said standard state is an image processing apparatus including hardware or software in addition to a configuration of said image processing apparatus in said standard state.

12. The image processing apparatus according to claim 1, wherein said read partial snap shot image is a snap shot image corresponding to the difference in configuration between said image processing apparatus after the change and said image processing apparatus before the change.

13. The image processing apparatus according to claim 1, wherein said read partial snap shot image is a snap shot image corresponding to the difference in configuration between said image processing apparatus in said standard state and said image processing apparatus after the change.

14. A hibernation start-up method in said image processing apparatus including (i) a volatile main memory, (ii) a first non-volatile memory for storing a plurality of types of partial snap shot images, wherein each of the plurality of types of partial snap shot images is differential information between an entire snap shot image for hibernation start-up of the image processing apparatus in a standard state and an entire snap shot image for hibernation start-up of said image processing apparatus different in configuration from the standard state, (iii) a second non-volatile memory from which information can be read faster than from said first non-volatile memory, for storing one of said entire snap shot images, said second non-volatile memory being different from said first non-volatile memory, and (iv) a processor, comprising the steps of:
    specifying, by said processor, when a hardware or a software of said image processing apparatus is changed into a different type of hardware or software, respectively, a difference in configuration between said image processing apparatus after the change and the image processing apparatus before the change, wherein said difference in configuration, when said hardware or software is changed into a different type of hardware or software, affects start-up controls;
    reading, by said processor, a partial snap shot image necessary for start-up of said image processing apparatus after said hardware or said software is changed into the different type of hardware or software based on said specified difference in configuration, from said first non-volatile memory;
    when said hardware is replaced or said software is upgraded into the same type of hardware or software, (i) said difference in configuration does not affect start-up controls and (ii) the entire snap shot image is not rewritten.

15. The hibernation start-up method according to claim 14, wherein said entire snap shot image stored in said second non-volatile memory includes at least one of an entire snap shot image before said configuration is changed and an entire snap shot image after said configuration is changed.

16. The hibernation start-up method according to claim 14, wherein
    said image processing apparatus further includes an operation portion for entering setting involved with said image processing apparatus,
    said specifying step includes specifying the difference in configuration between said image processing apparatus after the change and the image processing apparatus before the change based on an entered prescribed setting,
    said reading step includes the step of reading said partial snap shot image necessary for start-up of said image processing apparatus after the change based on said specified difference in configuration, from said first non-volatile memory, and
    said rewriting step includes the step of rewriting, when the hardware or software is changed into the different type of hardware or software, the entire snap shot image in said second non-volatile memory by using said read partial snap shot image.

17. The hibernation start-up method according to claim 14, wherein
    said reading step includes the steps of determining, when power of said image processing apparatus is turned on, whether change from a configuration of said image processing apparatus when power was previously turned off has been made,
    when it is determined that said configuration has been changed, the reading step further includes specifying the difference in configuration between said image processing apparatus after the change and said image processing apparatus before the change and reading said partial snap shot image necessary for start-up of said image processing apparatus after the change based on said specified difference in configuration from said first non-volatile memory, and
    said rewriting step includes the step of rewriting, when the hardware or software is changed into the different type of hardware or software, the entire snap shot image in said second non-volatile memory by using said read partial snap shot image.

18. The hibernation start-up method according to claim 14, wherein said reading step includes the steps of (i) specifying, when the software of said image processing apparatus is changed into the different type of software, the difference in configuration between said image processing apparatus after the change and the image processing apparatus before the change, and (ii) reading said partial snap shot image corresponding to said changed software configuration from said first non-volatile memory, and
    said rewriting step includes the step of rewriting the entire snap shot image in said second non-volatile memory by using said read partial snap shot image.

19. The hibernation start-up method according to claim 14, wherein the second non-volatile memory stores a plurality of the entire snap shot images, and, when said hardware or said software is changed into the different type of hardware or software, the processor rewrites one of the plurality of the entire snap shot images according to a predetermined sequence in the updating step.

20. The hibernation start-up method according to claim 19, wherein the second non-volatile memory stores a first entire snap shot image and a second entire snap shot image, and, when the hardware or said software is changed into the different type of hardware or software, the processor rewrites the first entire snap shot image and the second entire snap shot image alternately each time the configuration of the image processing apparatus is changed.

21. The image processing apparatus according to claim 14, wherein
    said differential information corresponds to an optional configuration, and
    said entire snap shot image includes said partial snap shot image based on said differential information corresponding to said optional configuration of said image processing apparatus and a common snap shot image corresponding to a configuration different from said optional configuration.

22. The image processing apparatus according to claim 14, wherein said second non-volatile memory further stores a normal start-up firmware program which is used for start-up of said image processing apparatus without the use of a quick start up.

23. The hibernation start-up method according to claim 14, wherein when said entire snap shot image is rewritten, said rewritten entire snap shot image includes a snap shot image for hibernation start-up of said image processing apparatus in said standard state and a partial snap shot image corresponding to a configuration not included in said image processing apparatus in said standard state.

24. The hibernation start-up method according to claim 14, wherein said image processing apparatus in said standard state is an image processing apparatus not having hardware or software added as compared with the image processing apparatus at time of shipment, and said image processing apparatus different in configuration from said standard state is an image processing apparatus including hardware or software in addition to a configuration of said image processing apparatus in said standard state.

25. The hibernation start-up method according to claim 14, wherein said read partial snap shot image is a snap shot image corresponding to the difference in configuration between said image processing apparatus after the change and said image processing apparatus before the change.

26. The hibernation start-up method according to claim 14, wherein said read partial snap shot image is a snap shot image corresponding to the difference in configuration between said image processing apparatus in said standard state and said image processing apparatus after the change.

* * * * *